Sept. 22, 1925.　　　　　　　　　　　　　　　　1,554,385
F. R. STILL
MACHINE FOR SECURING FAN BLADES TO END PLATES
Filed Oct. 7, 1921　　　14 Sheets-Sheet 3

Sept. 22, 1925 1,554,385
F. R. STILL
MACHINE FOR SECURING FAN BLADES TO END PLATES
Filed Oct. 7, 1921 14 Sheets-Sheet 4

Witness:
Jas E. Hutchinson

Inventor:
Frederick R. Still,
By
Milans & Milans
Attorneys.

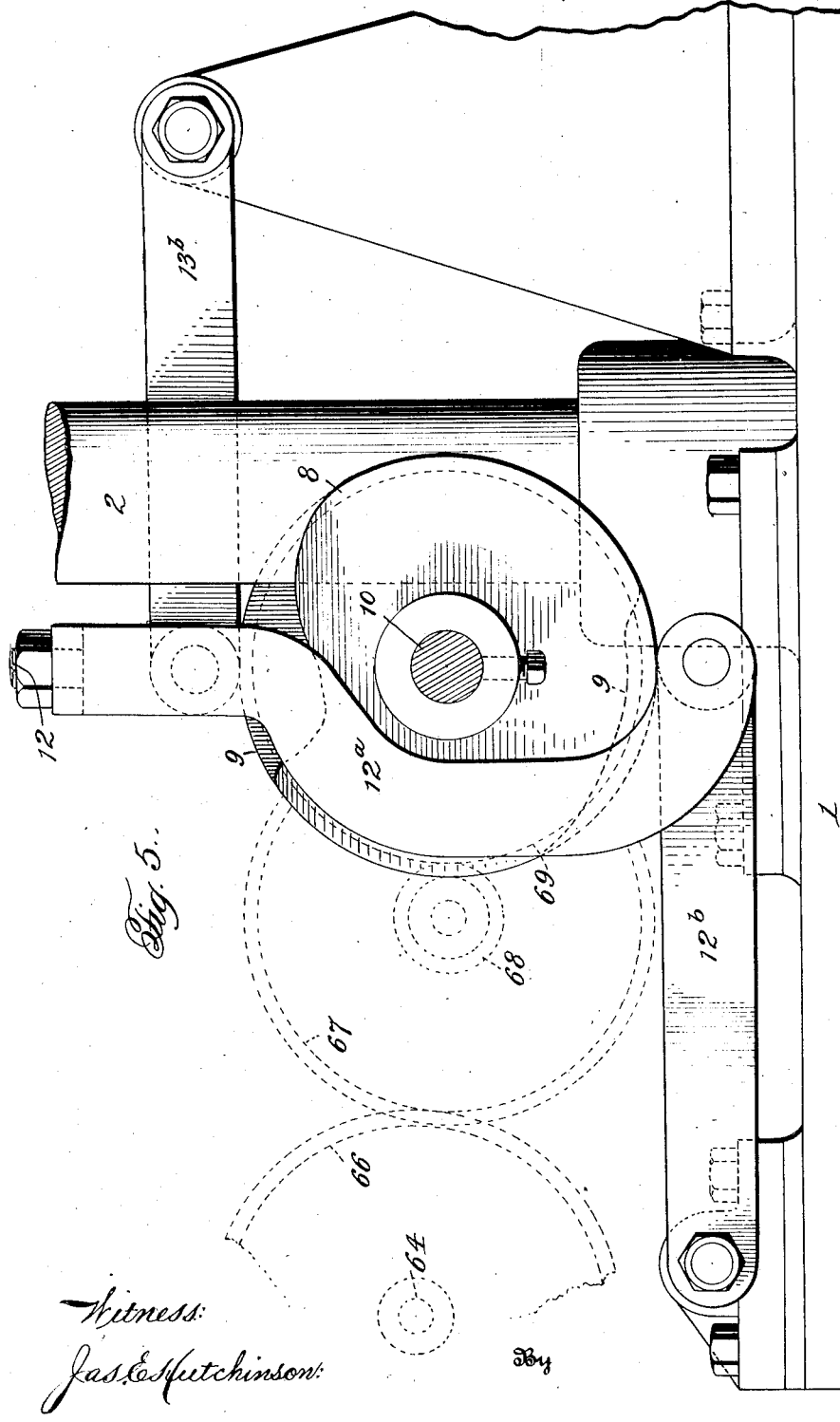

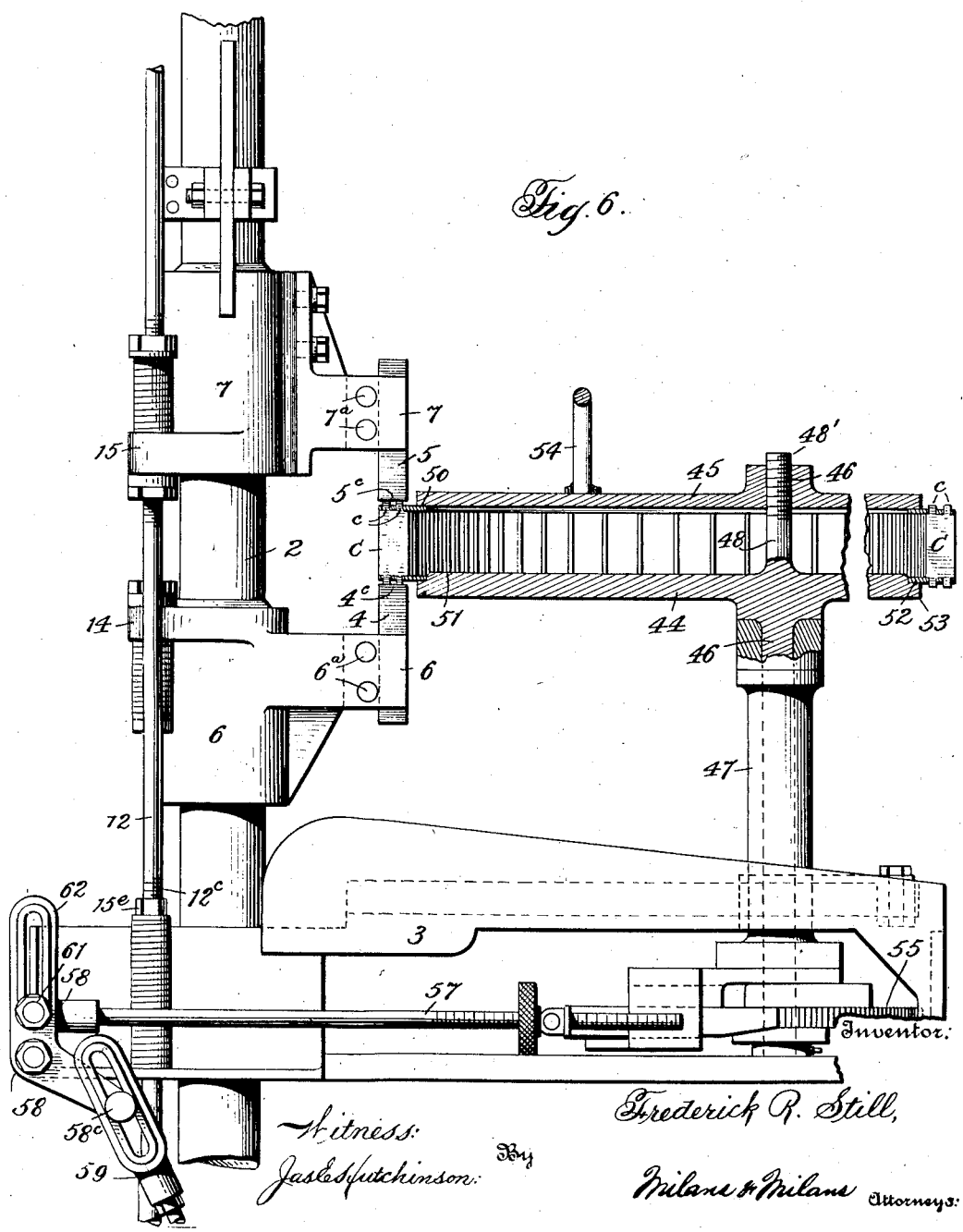

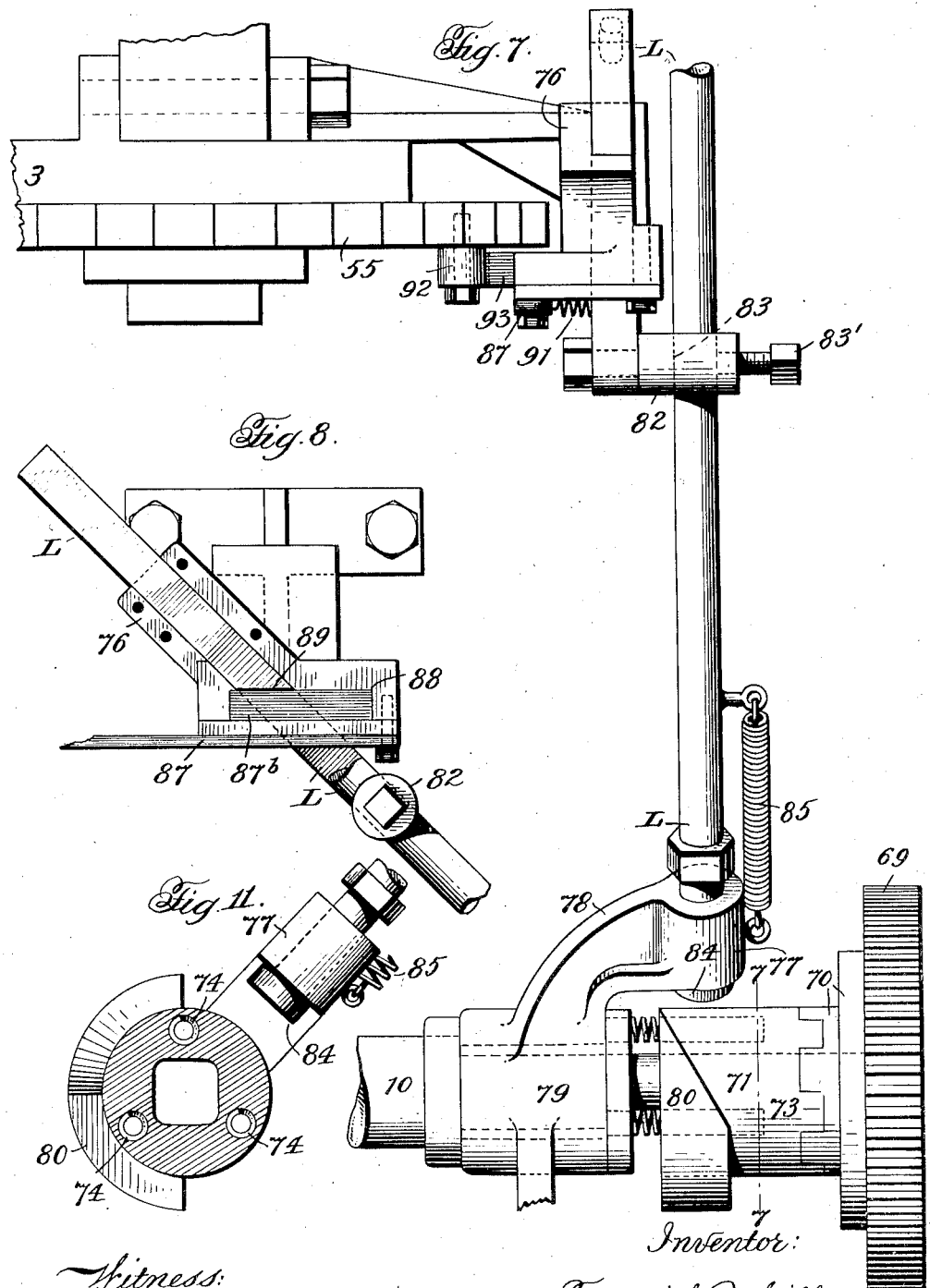

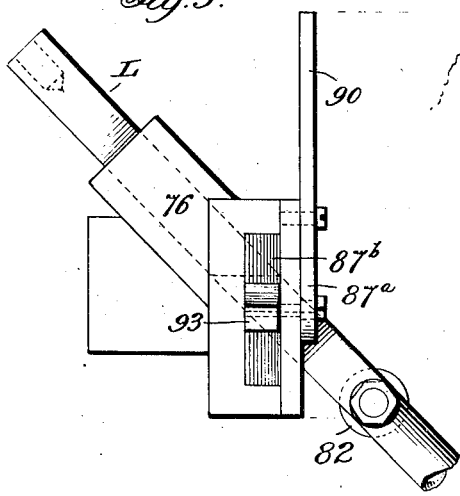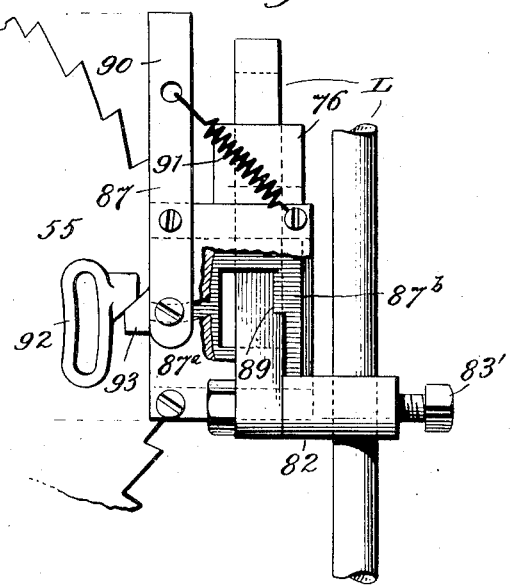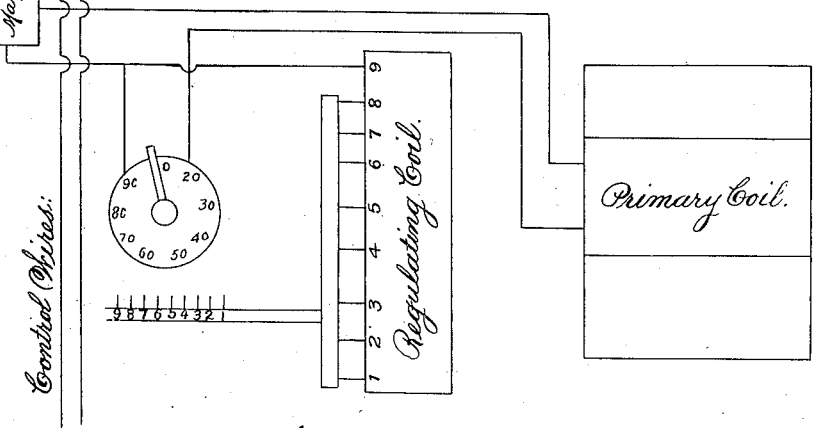

Sept. 22, 1925. 1,554,385
F. R. STILL
MACHINE FOR SECURING FAN BLADES TO END PLATES
Filed Oct. 7, 1921 14 Sheets-Sheet 9
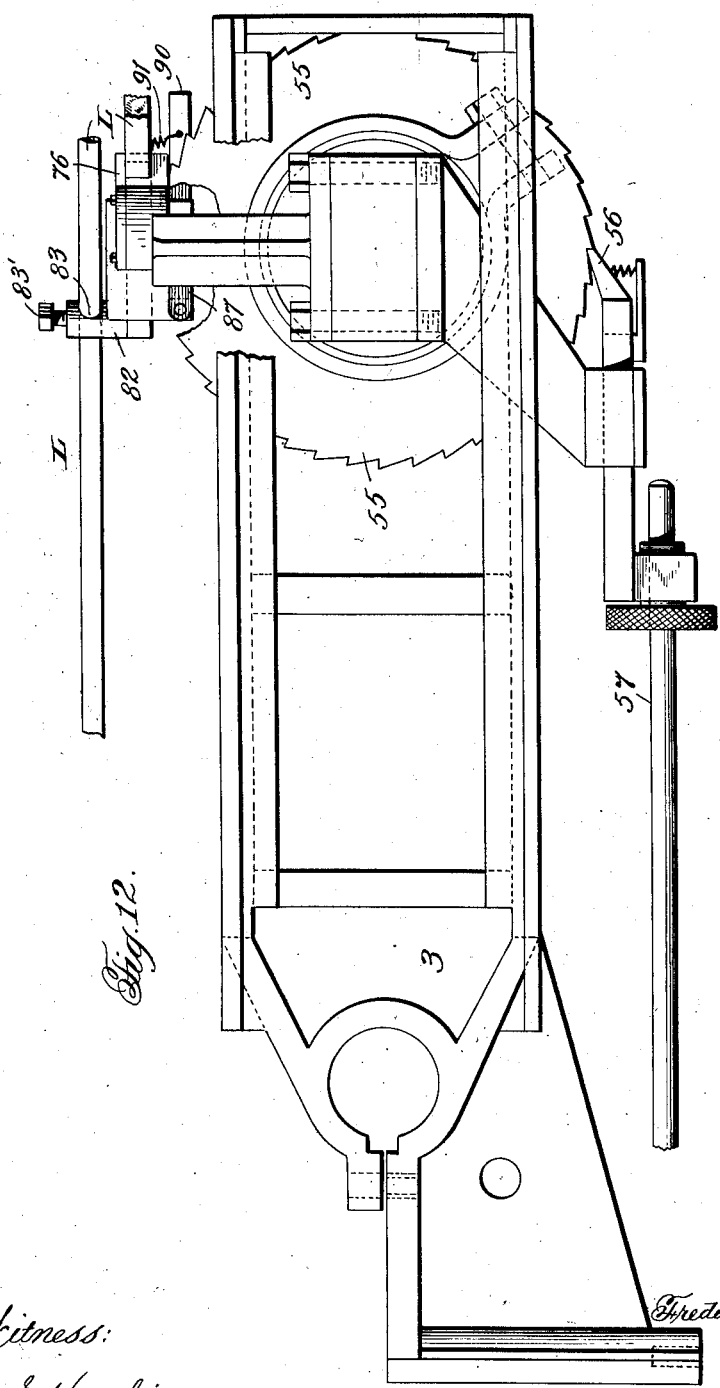

Sept. 22, 1925. 1,554,385
F. R. STILL
MACHINE FOR SECURING FAN BLADES TO END PLATES
Filed Oct. 7, 1921 14 Sheets-Sheet 10
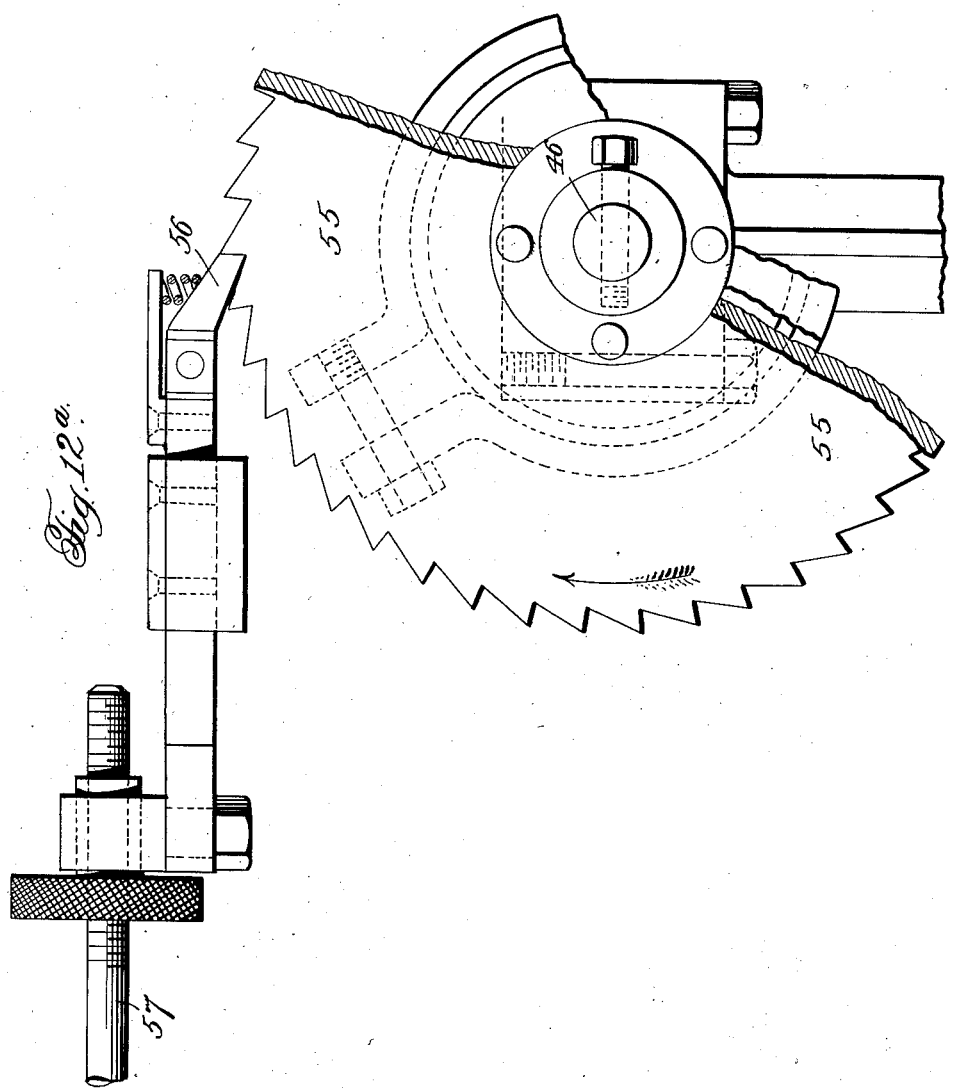

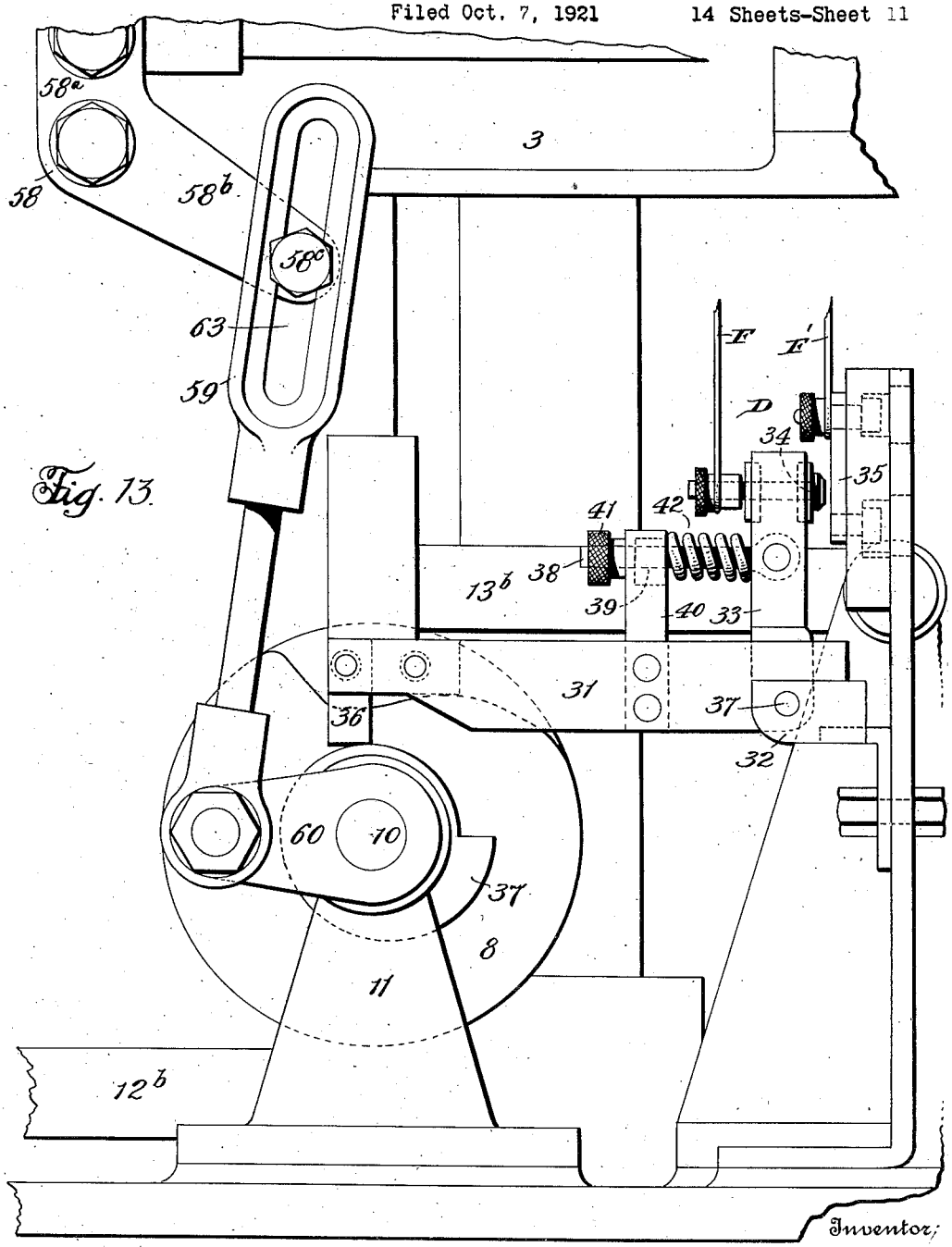

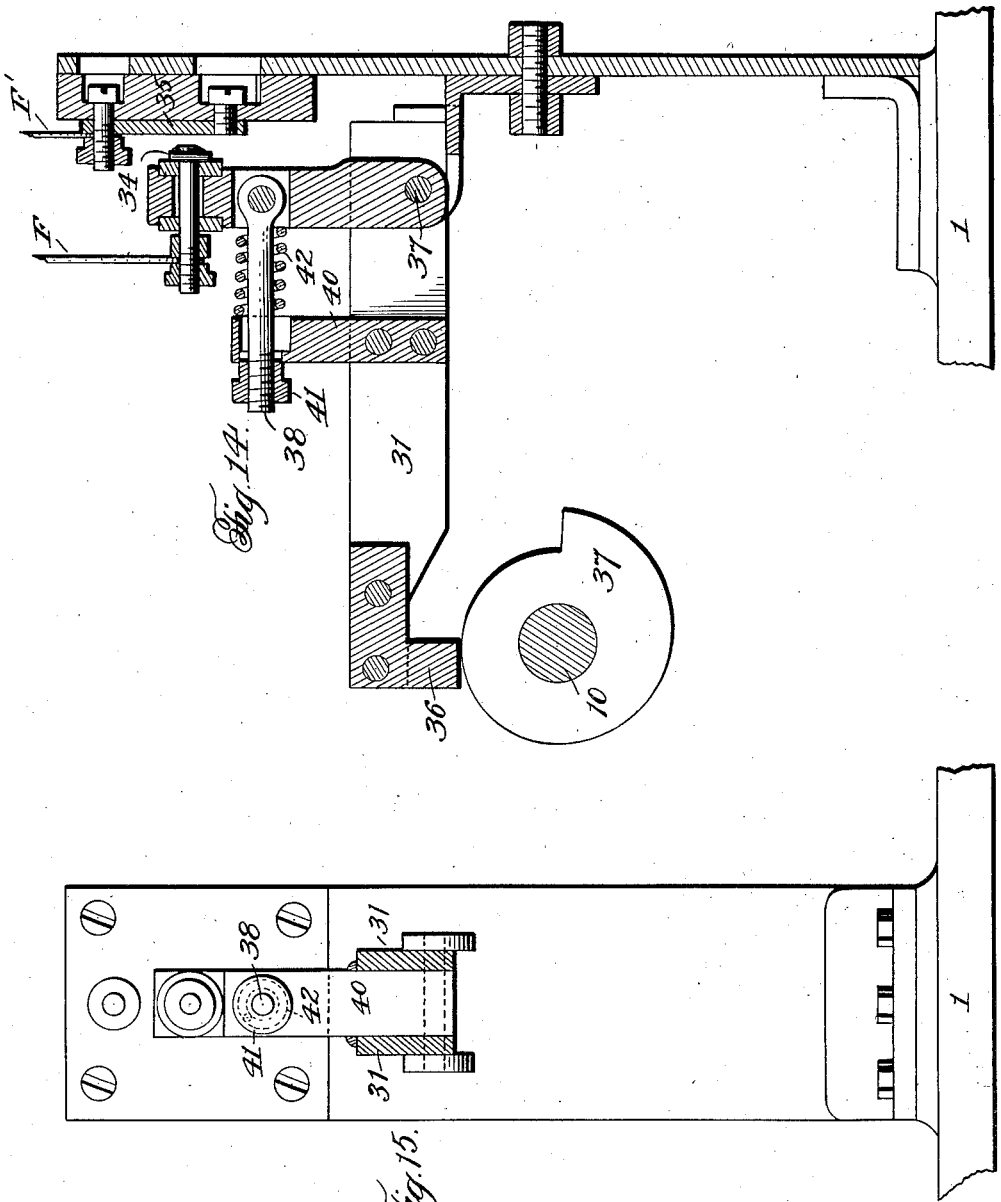

Sept. 22, 1925.  1,554,385
F. R. STILL
MACHINE FOR SECURING FAN BLADES TO END PLATES
Filed Oct. 7, 1921  14 Sheets-Sheet 13
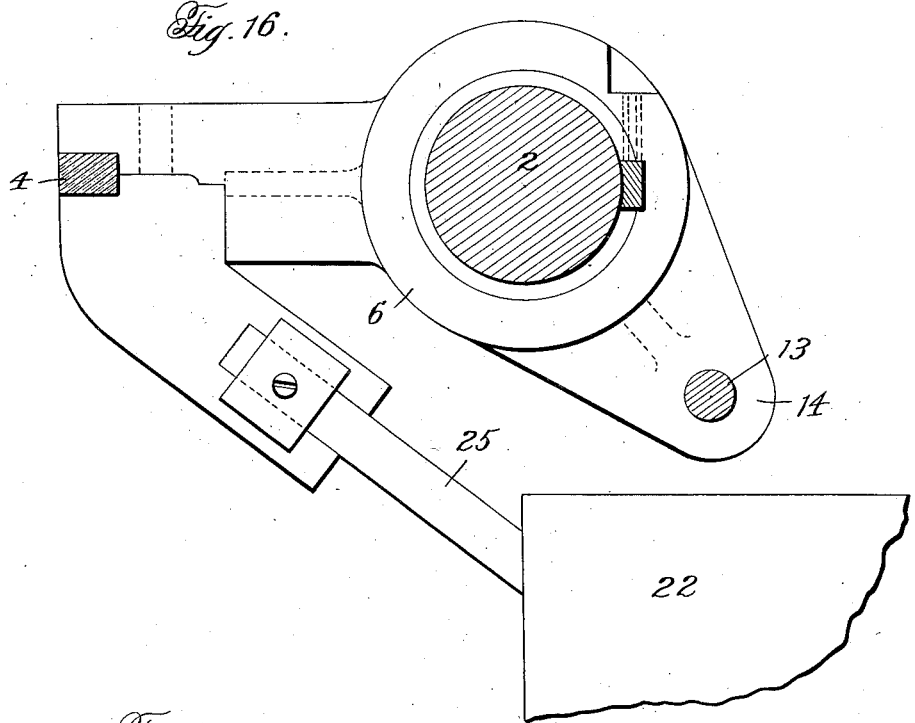
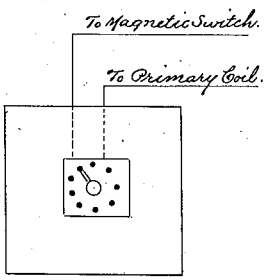
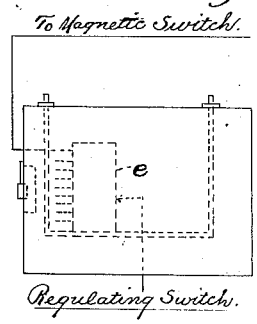
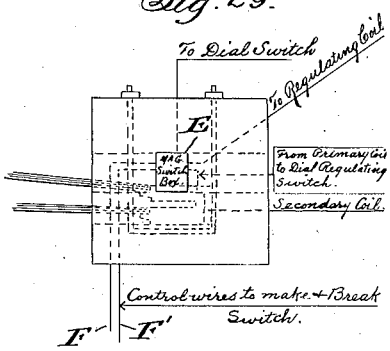

Sept. 22, 1925. 1,554,385
F. R. STILL
MACHINE FOR SECURING FAN BLADES TO END PLATES
Filed Oct. 7, 1921 14 Sheets-Sheet 14
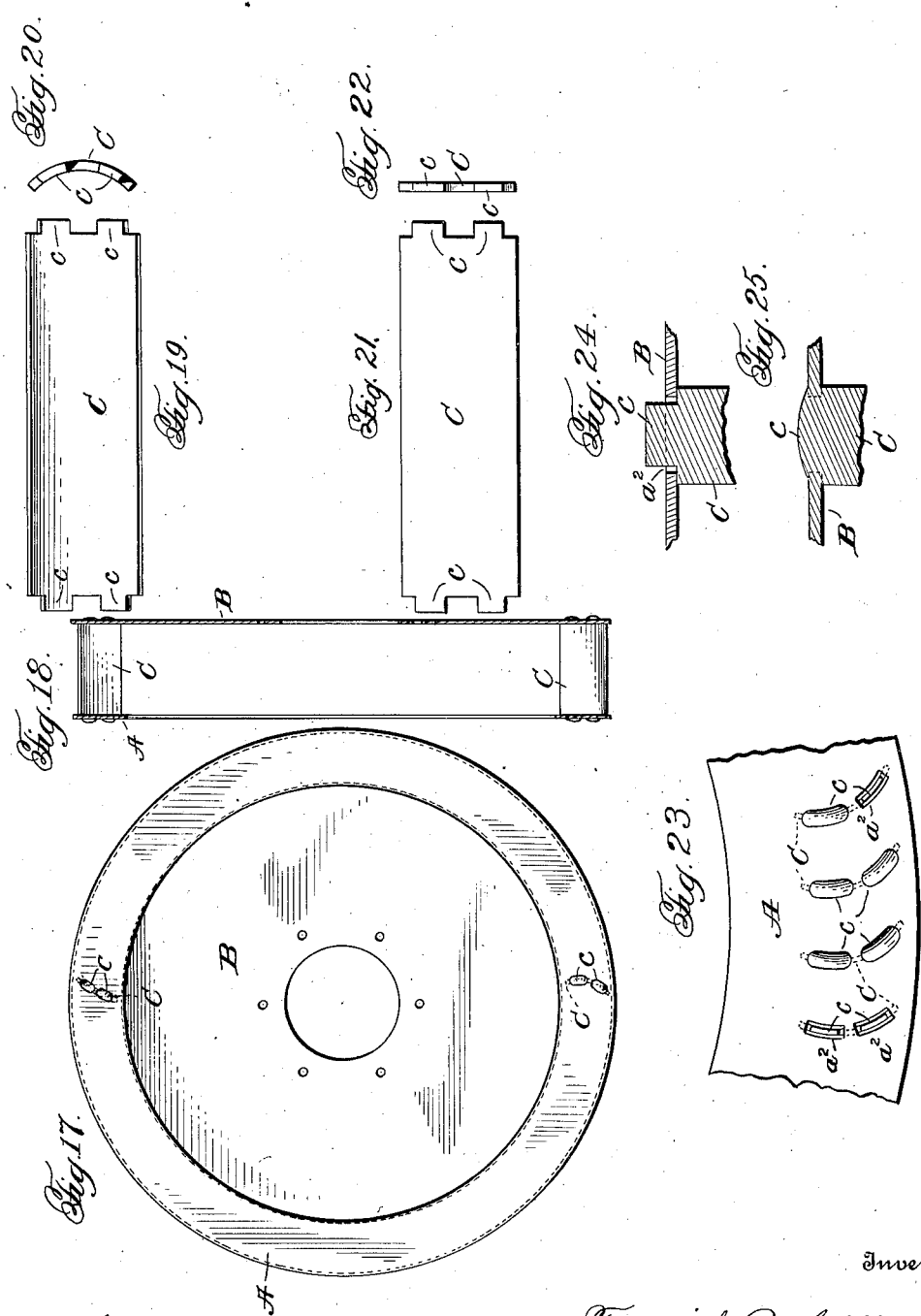

Patented Sept. 22, 1925.

1,554,385

UNITED STATES PATENT OFFICE.

FREDERICK R. STILL, OF DETROIT, MICHIGAN, ASSIGNOR TO AMERICAN BLOWER COMPANY, OF DETROIT, MICHIGAN, A CORPORATION OF MICHIGAN.

MACHINE FOR SECURING FAN BLADES TO END PLATES.

Application filed October 7, 1921. Serial No. 506,191.

*To all whom it may concern:*

Be it known that I, FREDERICK R. STILL, a citizen of the United States, residing at Detroit, in the county of Wayne and State of Michigan, have invented certain new and useful Improvements in Machines for Securing Fan Blades to End Plates, of which the following is a specification, reference being had therein to the accompanying drawing.
This invention relates to an improved process and machine for securing fan blades to end plates or rims, the same being particularly adapted for and advantageous in the manufacture of fan wheels of light build having long narrow blades and an enlarged intake.

Heretofore in the art, it has been proposed to secure the blades to the end plates, rims or supporting elements by riveting but such constructions have proven unsatisfactory, the joints or connections between the parts soon shaking loose and rattling. Furthermore, riveting is unsuitable and seriously objectionable in the manufacture of fan wheel structures of light build of the character referred to because the shock incident to the usual riveting operation damages the parts, and effects the trueness of the wheels.
The object of the present invention is to provide an improved method and machine whereby the fan wheel parts can be rapidly secured together without injurious shock or pressure thereto, and a more efficient joining and better connection of the parts obtained, and whereby a strong, more durable and perfect fan wheel is produced at low cost.

The invention, with other objects and advantages thereof, will be understood from the hereinafter contained detail description, when considered in connection with the accompanying drawings forming part hereof, and illustrating one form of apparatus for carrying out the improved method.

In the drawings:

Fig. 5 is a detail side elevation of part of the cam and lever mechanism.

Fig. 6 is a detail transverse section, on an enlarged scale, of the rotating work support, with the parts of a fan wheel clamped thereon in assembled relation, the combined electrodes and pressing members being shown in side elevation.

Fig. 7 is a detail view of the clutch associated with the controlling lever.

Figs. 8, 9 and 10 are detail views, on an enlarged scale, of the controller lever and automatic trigger and trip mechanism.

Fig. 11 is a section on line 7—7 of Figure 7.

Fig. 12 is a detail plan, on an enlarged scale, of the indexing mechanism for the rotatable work support.

Figure 1:
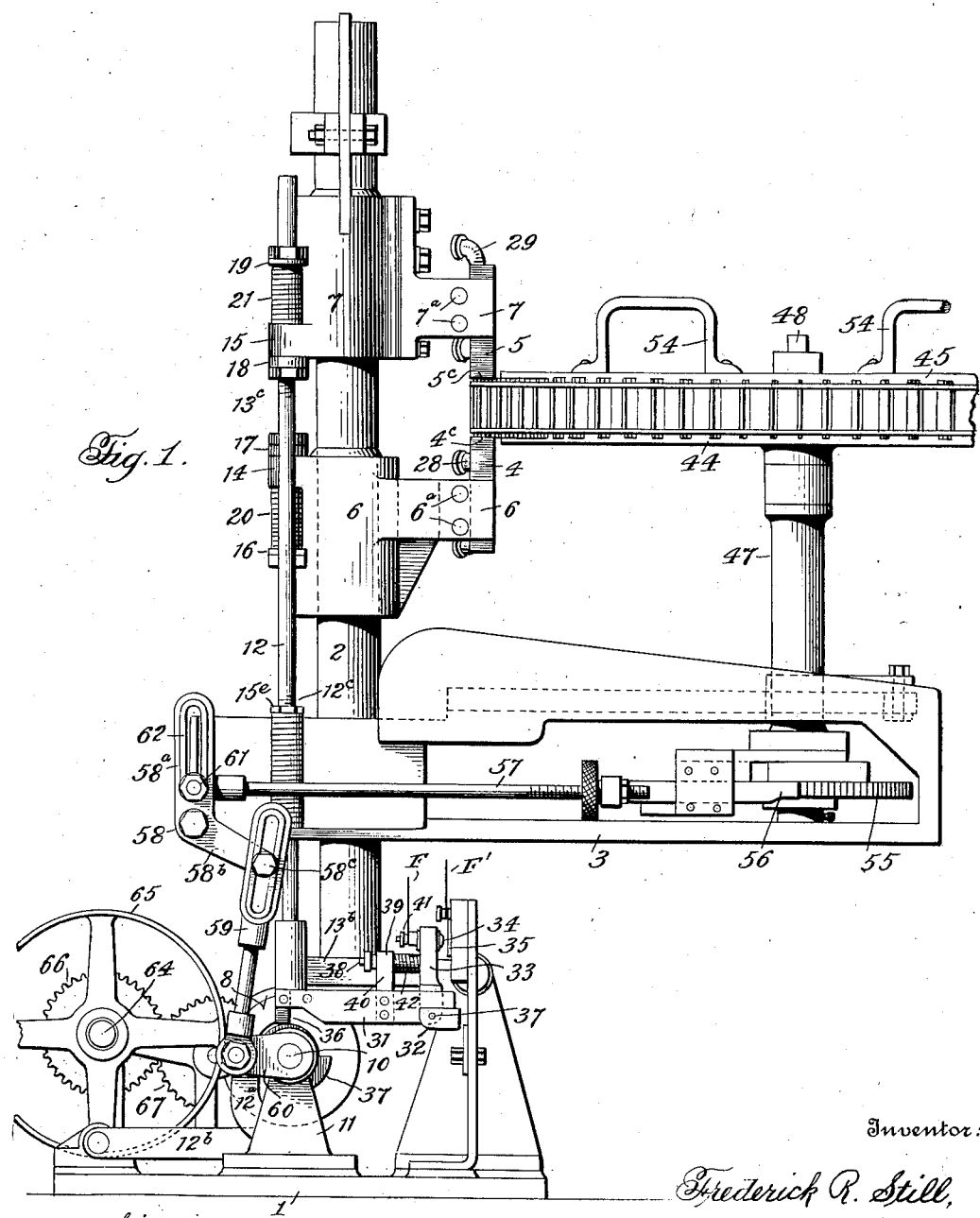
Figure 1 is an elevation of one end of a machine constructed in accordance with the present invention.
Figure 2:
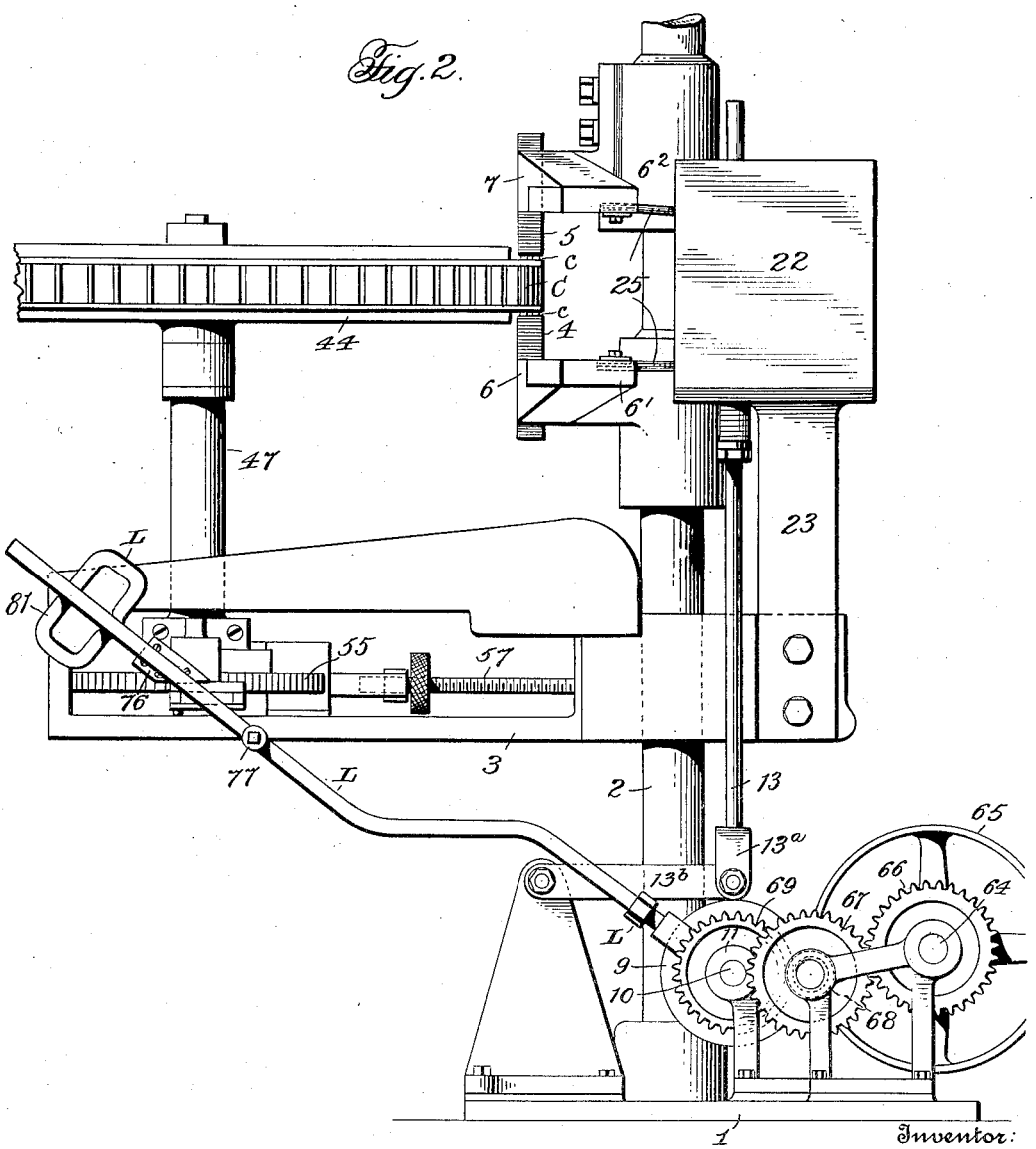
Fig. 2 is a similar view taken from the other end of the machine.
Figure 3:
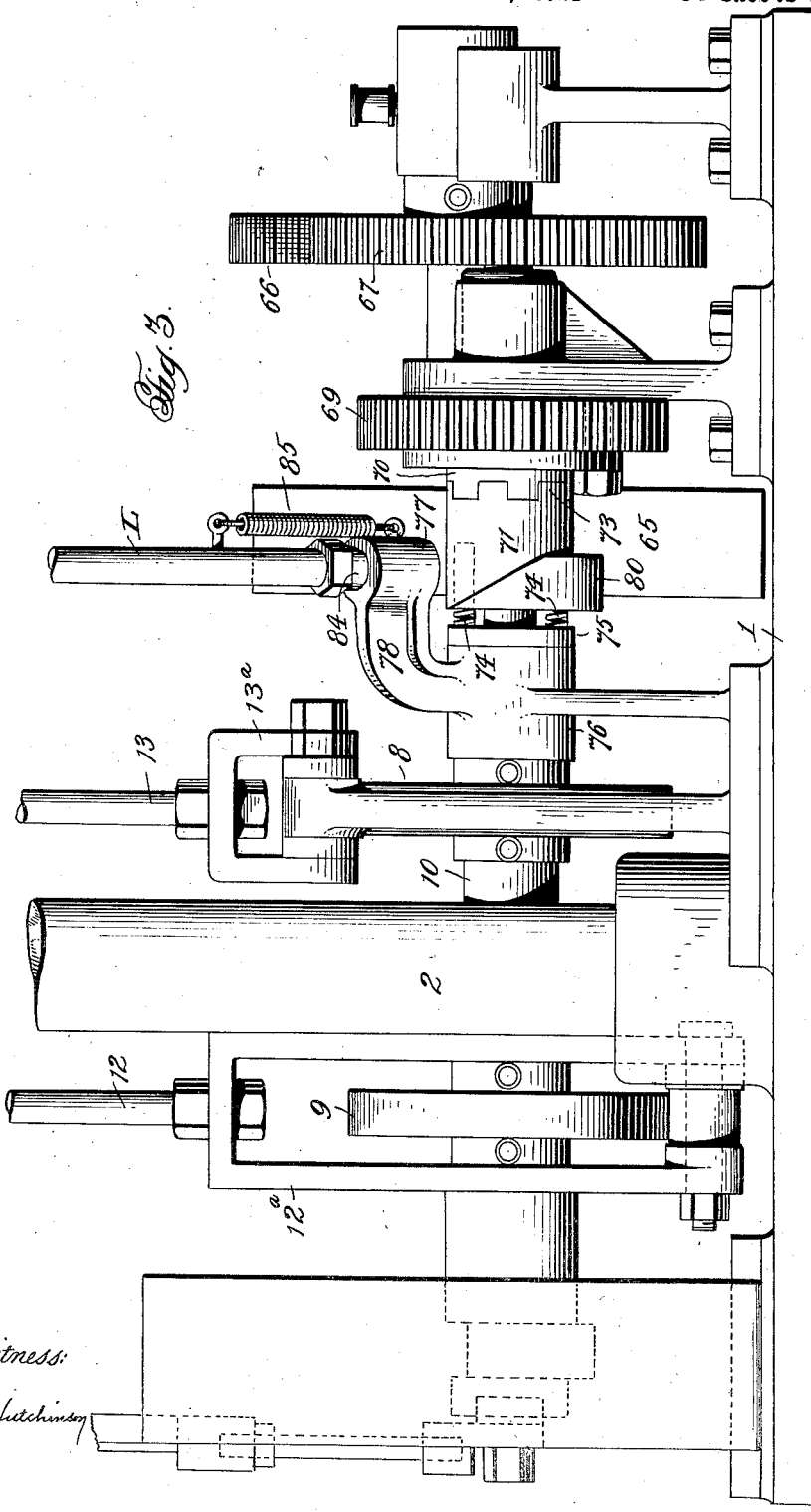
Fig. 3 is a front elevation, on an enlarged scale, of the cam shaft and associated parts, at the base or lower part of the machine.
Figure 4:
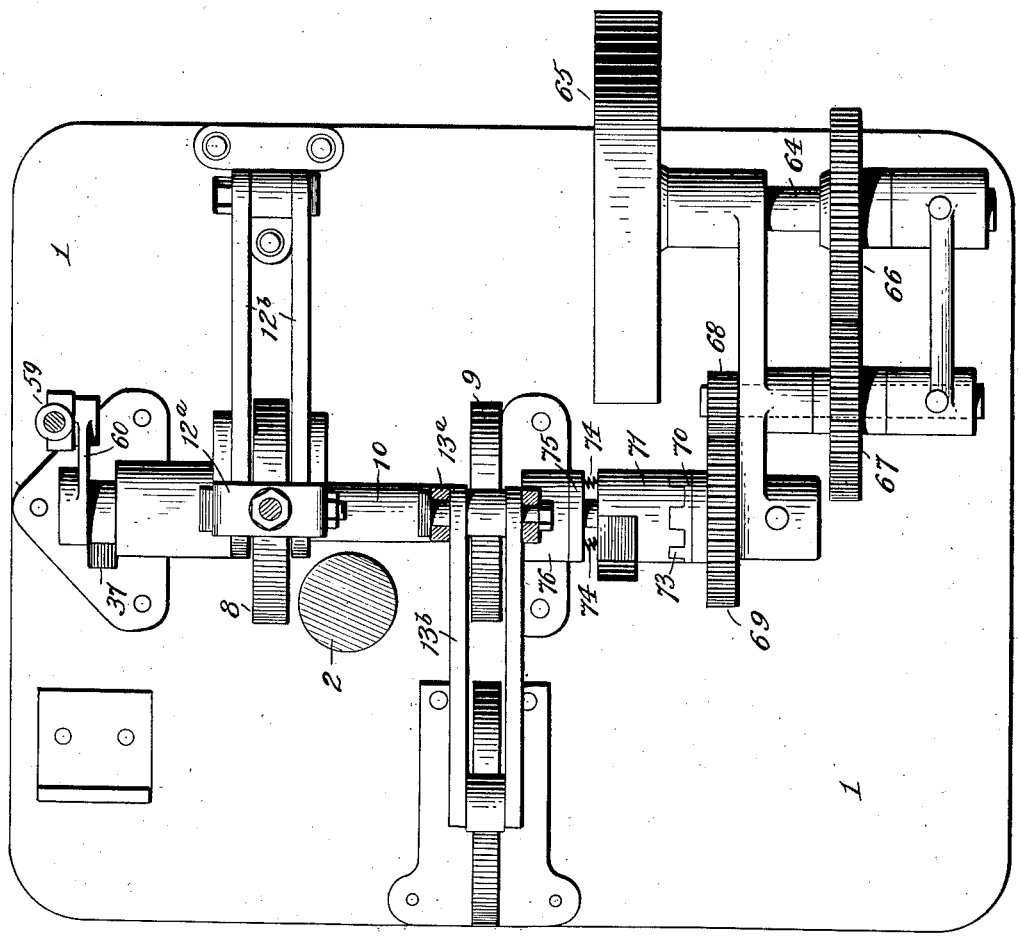
Fig. 4 is a plan, on an enlarged scale, of the driving mechanism at the lower part of the frame, certain of the parts being shown in section.

Fig. 12ª is a detail view of the indexing mechanism, with certain parts broken away.

Fig. 13 is a detail side elevation of one of the switches for controlling the circuit for the electrodes.

Figs. 14 and 15 are respectively longitudinal and transverse sections of the switch illustrated in Fig. 13.

Fig. 16 is a detail, on an enlarged scale, illustrating the connection of the secondary of the transformer to the electrodes.

Fig. 17 is an end elevation of a fan wheel construction in accordance with the present invention.

Fig. 18 is a transverse sectional view of the fan wheel illustrated in Fig. 17.

Figs. 19, 20, 21 and 22 are detail views of one of the blades of the wheel.

Fig. 23 is a detail top plan view, on an enlarged scale, of a portion of one of the end plates or rims with the projecting end portions of some of the blades shown before the welding operation, and others after the welding operation.

Figs. 24 and 25 are detail sectional views through the end portion of a blade and the adjoining end plate or rim portion illustrating the construction prior to and after the welding operation.

Figs. 26, 27, 28 and 29 are diagrammatic views showing the circuit connections.

In accordance with the improved method of the present invention the fan blades are provided with projecting portions at the ends thereof, and the end plates or rims with apertures to receive the projecting end portions of the blades. The apertures in the end plates are made of the same shape as and of slightly greater area than the initial cross sectional shape and size of the projecting end portions of the blades and the latter are formed initially of a length to project beyond and provide a mass of metal beyond the outer faces of the end plates or rims when the blades and rims are assembled. The mass or volume of metal provided on the projecting end portion of the blade beyond the outer face of the rim is at least substantially equal to the difference in the cross sectional size of the projecting portion of the blade and the area of the aperture, or of sufficient volume to fill up the intervening space between the projecting end portion of the blade and the wall of the aperture. Preferably the volume of metal provided on the projecting end portion of the blade beyond the end plate or rim is in excess of that necessary to fill up the intervening space between the projecting end portion of the blade and the wall of the aperture. The blades and end plates or rims are firmly held together in assembled relation, the end plates or rims contacting with and being tightly clamped against the main end portions of the blades, the projecting end portions of the blades extending through the apertures of the end plates or rims beyond the outer faces thereof. The projecting end portions of each of the blades are simultaneously subjected to heat and pressure by a pair of combined electrodes and pressure members operating simultaneously on opposite end portions of the blade to melt down the projecting end portions of the blade to fill up the space between the projecting end portions of the blade and the wall of the aperture, and weld the adjoining parts together, the blades being presented successively to the action of the electrodes and pressure members. Simultaneously with the contact of the electrodes and pressing elements with the projecting end portions of the blades, the current is turned on, the projecting end portions of the blades become heated almost white hot and under the pressure of the combined electrodes and pressing members, the intervening spaces are filled up with metal. As will be understood, the end plate or rim portions immediately surrounding the apertures are also simultaneously subjected to a welding heat, and the surfaces of the jointed portions at the outer faces of the end plates are formed smooth by the pressing action of the combined electrodes and pressing members, the projecting end portions of the blades, in the construction shown, being of a length to not only provide sufficient metal to fill up the intervening spaces between the projecting end portions of the blade and the wall of the recess but also to form a reinforcing head like portion projecting beyond the outer face of the end plate after the welding operation.

In the drawings Figures 17 and 18, is illustrated a fan wheel constructed in accordance with the present method. The structure shown comprises end plates or rims A, B, and blades C. Each blade C in this particular instance, is provided at its ends with two projecting portions $c$, $c$, and the end plates or rims A, B, correspondingly are provided with two series of apertures $a^2$, around the same to receive the projecting portions $c$, $c$, of the blades. The blades C are blanked from sheet steel or other suitable metal, as indicated in Figures 19 to 22 inclusive, of the drawings. It will be understood that the number of projecting portions for each blade, and the corresponding number of apertures in the end plates or rims may be varied to meet different conditions, one of said projections on the end of each blade being sufficient in some instances. In Figure 23 of the drawings, is illustrated in side elevation a section of one of the end plates with some of the projecting end portions of the blades prior to the welding operation and other end portions after the welding operation: and Figures 24 and 25 are detail sectional views through the end portion of a blade and the adjoining rim portion showing the construction prior to and after the welding operation.

The apparatus illustrated in the drawings for carrying out my improved method includes a pair of reciprocating combined electrodes and pressure members adapted to simultaneously clamp the work evenly from each side, and apply heat and pressure to the opposite projecting end portions of the blade, and the end plate portions immediately adjoining the apertures, a rotatable support to hold the fan wheel parts in assembled position, indexing mechanism for rotating the work support step by step to successively present the blades of the wheel in position to be operated upon by the combined electrodes and pressure members, automatic switch mechanism controlling the supply of current to the combined electrodes and pressure members, power driven operating means for the electrodes, indexing mechanism, manual control means, and automatic stop mechanism for stopping the machine after a complete cycle of operations, the several elements being so timed in operation that as the combined electrodes and pressure members are brought into contact with the projecting end portions of the blade, the circuit is simultaneously closed through the electrodes and the interposed blade, and the circuit and operation of the electrodes upon the work is maintained just long enough to melt down the projecting end portions of the blade to fill up the intervening spaces between the same and the walls of the apertures, and weld the parts together, the combined electrodes and pressing elements being then withdrawn from the work, and the circuit broken, the rotating table being then advanced to bring the next blade in position, the machine continuing to operate in this way until a full cycle of operations has been completed when the same is automatically stopped.

The frame of the machine, which may be of any suitable construction, is shown as comprising a base 1, a vertical standard or column 2, and a horizontal arm or part 3 extending laterally from the column 2 above the base.

4, 5, designate the pair of combined electrodes and pressure members supported for reciprocation vertically, said members being suitably mounted upon carrier blocks 6, 7, slidably engaging the column 2. The carrier blocks 6, 7, are reciprocated simultaneously toward and from each other by cams 8, 9, fixed on a rotary driven horizontal shaft 10, supported in bearings 11 on the base 1 of the frame, and vertical rods 12, 13, provided with yokes 12ª, 13ª at their lower ends respectively engaging the cams 8, 9, and being connected at their upper ends with the carrier blocks 6, 7. 12ᵇ, 13ᵇ, are links pivotally connected with the frame, and to the lower portions of the vertical rods 12, 13. 13ª designates a coiled spring interposed between an adjustable abutment 15ᵉ on the rod 12 and a portion of the horizontally extending arm 3 of the frame to assist in the operation of the upper carrier block 7. The carrier blocks 6, 7, are provided with lateral extensions 14, 15, having openings therein, and the rods 12, 13, have spaced abutments 16, 17, 18, 19, on opposite sides of said extensions, coiled compression springs 20, 21, being interposed between one of the abutments of each rod and one of the lateral extensions 13, 14, of the carrier blocks, the arrangement being such as to provide for the application of the combined electrodes and pressure members to the work with a yielding or spring pressure. The rods 12, 13, are preferably, as shown, provided with threaded portions 12ᶜ, 13ᶜ, and the abutments 16, 17, 18, 19; conveniently taking the form of nuts engaging the threaded portions of said rods for purposes of adjustment. The cams 8, 9, are of a shape to reciprocate the combined electrodes and pressure members 4, 5, simultaneously in opposite directions with a sufficient dwell at the outer and inner limits of their movements. The combined electrodes and pressure members 4, 5, which are adjustably secured to the carrier blocks 6, 7, in any suitable way, for instance by clamp screws 6ª, 7ª, as shown, have flat work engaging inner end faces, 4ᶜ, 5ᶜ, as shown, said work engaging end faces being of a size to extend beyond the projecting end portion of the blades over portions of the end blades immediately surrounding the apertures therein.

Any suitable means may be employed to supply a heating or welding current to the electrodes 4, 5. In the drawings, a transformer 22 of well known construction is shown for the purpose, the same being suitably supported on a bracket 23 on the arm 3. 24 designates the primary of the transformer connected with any suitable source of electric current, as an electric generator, not shown, and 25 is the secondary provided with flexible extensions 26, 27, which are electrically connected with the portions 6', 7², of the carrier blocks 6, 7, said portions 6' 7², being formed of copper, and suitably insulated from the other parts. 28, 29, are rigid pipe portions to which flexible pipes, not shown, leading from any suitable source are connected to supply a cooling medium to the electrodes 4, 5.

Referring particularly to Figures 13, 14, and 15 of the drawings, the automatic switch mechanism for controlling the supply of current to the electrodes 4, 5, includes a circuit breaker D interposed in the primary circuit and comprising an arm or lever 31 pivotally mounted at one end for oscillation vertically upon a base 32 secured to the base 1 of the main frame, said arm or lever 31 having a finger 33 provided at one end adapted to co-operate with a contact 34 adapted to co-operate with a stationary contact strip 35 mounted upon the upper portion of the switch base. The arm or lever 31 at its other end is provided with a portion 36 to engage a cam 37 adjustably secured upon the shaft 10, the cam 37 being adapted to periodically lift the outer end portion of the arm or lever 31 to move and hold the contact 34 in engagement with the stationary contact 35, the circuit being closed and opened at intervals in unison with the operation of the combined electrodes and pressure members 4, 5. The finger 33 is adjustably and yieldably mounted upon the arm or lever 31, said finger 33 is pivoted at its lower end to the arm or lever 31 at 37, and pivotally connected at one end to the finger 33 is a rod 38, said rod at its other end extending through a bearing 39 on a post 40 rigidly connected with the lever 31. 41 designates a nut adjustably engaging a threaded part on the outer end portion of the rod 38, and 42 is a coiled expansion spring mounted on the rod 38 and having its opposite ends bearing against the finger 33 and the post 40. As will be understood the period of contact between the contacts 34, 35, may be regulated through the adjustment of the nut 41, the coiled spring 42 acting to compensate for the difference in movement of the arm or lever 31 for different angular adjustments of the finger relatively to the arm or lever.

An electric magnetic switch E is preferably employed in conjunction with the circuit breaker D. The magnetic switch E may be of any suitable construction, one of the well known forms being shown in a general way. e designates the coil of the magnetic switch. The circuit breaker D and electric magnetic switch E are connected in the primary circuit as indicated diagrammatically in Figure 29, the circuit arrangements being such that upon the engagement of the contacts 34, 35, of the circuit breaker D, a circuit is first completed through the coils e of the electric magnetic switch E, which is thus operated and in turn closes the circuit upon the work. F, F', G, G', designate the circuit connections of the primary cuircuit with the contacts 34, 35, of the circuit breaker D, and with the electric magnetic switch. A manually operable switch H may also be provided, the same being closed when the machine is to be operated.

The rotatable work holding means (see especially Figures 1 and 6 of the drawings) comprises a horizontally disposed table 44 and an upper clamp plate 45. The table 44 is fixed on the upper end of a vertical shaft 46 which is supported for rotation in a tubular bearing 47 that extends upwardly from the horizontal arm 3 of the frame. The clamp plate 45 is provided with a central opening 46, the wall of which is threaded to adjustably engage an upper threaded portion 48' of a vertical stem 48 on the table 44, said clamp plate 45 being adapted to be turned up on the stem 48 tightly against the upper end plate 50 of an assembled fan wheel resting on the table 44 (see Figure 6 of the drawings), to firmly clamp the assembled parts of the fan wheel together in proper position on the table, the table 44 and top plate 45 which are shown circular, being of a size to engage the end plates inwardly of and adjacent to the apertures therein, sufficient clearance being provided for the engagement of the work by the electrodes. In order to assist in the proper centering of the work on the table 44, the latter may be provided with a central raised portion 51 to nicely fit inside the lower end plate 52 the latter fitting over the raised portion 51 and resting upon the outer reduced marginal portion 53 of the table. 54 designates handles for the clamp plate 45.

The table 44 is advanced at intervals to present the blades in succession to the electrodes in proper timed relation with the operation thereof through the medium of a ratchet wheel 55 fixed on the lower end portion of the vertical shaft 46, and co-operating pawl 56 at the outer end of a reciprocating rod 57, motion being transmitted to the rod 57 by a bell crank lever 58 connected by a link 59 with a crank 60 on the cam shaft 10. The reciprocating rod 57 is adjustable in length, as shown, and said reciprocating rod at one end has a slide 61 engaging a slot 62 in one arm 58$^a$ of the bell crank 58, and the other arm 58$^b$ of the bell crank has a pin 58$^c$ slidably engaging a slot 63 in one end of the link 59 (see particularly Figures 1, 12 and 12$^a$ of the drawing).

Referring more particularly to Figures 3, 4, and 7 to 11 of the drawings 64 designates the power shaft, which may receive power from any suitable source, said shaft being shown provided with a pulley 65 at one end. A series of gear pinions 66, 67, 68, 69, are provided between the power shaft 64 and the cam shaft 10, the pinion 69 being mounted on the shaft 10 for rotation independently thereof, and a clutch being provided to couple said pinion 69 to the shaft 10. The clutch comprises a toothed portion 70 on the hub of the gear 69, and a movable member 71 connected with the shaft 10 to rotate there with and to slide longitudinally thereon, said movable member 71 of the clutch having a toothed part 73 to cooperate with the toothed portion 70 of the gear pinion 69. 74 designates coiled springs interposed between one side of the movable clutch member 71 and a collar 75 which in turn bears against one end of a bearing 76, said springs 74 exerting pressure upon the movable clutch member 71 to force the same into engagement with the toothed clutch portion 70 on the gear pinion 69. The operation of the clutch to couple the pinion 69 to the cam shaft 10 is under the control of a lever L slidably supported in a tubular guide 76 on the arm 3 of the frame, and a guide sleeve 77 carried by an arm 78 extending from a bearing 79, said lever L being adapted to co-operate with a cam part 80 on the movable clutch member 71 to shift and hold said movable clutch member out of engagement with the toothed part 70 of the pinion 69. The lever L which has a suitable handle or grip 81 at its upper end, is shown as constructed of two parts adjustably secured together, one of the lever parts having a lateral extension 82 provided with a socket 83, in which is clamped an end portion of the other lever part by a screw 83'. The lower end of the lever L, which is adapted to engage the cam part 80 of the movable clutch member may, as shown, be provided with a roll 84 at its lower end. 85 designates a coiled spring having its opposite ends secured respectively to the lever L and the sleeve 77, said spring 85 being arranged to exert a downward pull upon the lever L to maintain the same in a position with its lower end engaging the cam part 80 of the movable clutch member 71 to hold the latter out of engagement with the toothed part 70 of the pinion 69. By pulling the lever upwardly, the lower end thereof may be lifted clear of the movable clutch member 71, and the latter will then be moved by the spring 74 into engagement with the toothed part 70 of the pinion 69, the cam shaft 10 being then driven to operate the machine.

Mechanism is provided to lock the starting lever L in its uppermost inactive releasing position until the work holding means has made a full revolution and the machine completed a full cycle of operations. The mechanism for this purpose comprises a horizontally swinging trigger 87 pivotally mounted at one end on a plate 87ª and provided with an arm 87ᵇ adapted to extend through an opening 88 in the tubular guide 76 and engage a transverse slot 89 in the upper portion of the lever L as illustrated in Figures 9 and 10 of the drawings. 90 designates a handle part on the outer free end portion of the trigger. If desired, a spring 91 may also be provided to press the trigger in a direction to carry its lock arm 87ᵇ into engagement with the slot 89 in the lever L when the latter is raised to clutch releasing position. 92 designates a cam or trip member mounted on the ratchet wheel 55, said cam or trip member being adapted to engage a cam tooth 93 on the trigger 87 to automatically disengage the trigger 87 from the lever L when the table has made a full revolution and the electrodes have operated upon all of the blade ends of the fan wheel, the lever L, when released, being pulled down by the spring 85 so that its lower end will engage the cam part 80 on the movable clutch member 71, which, as will be understood, will be shifted out of engagement with the clutch part 70 on the pinion 69 and the machine thus automatically stopped.

It will be noted that the improved method and apparatus, as hereinbefore explained, provides for making an improved light build fan wheel, a fan wheel of this light build nature that is perfectly true and possesses great strength and rigidity, and that can be produced faster and at lower cost than the old type of riveted wheel. The special method for securing the wheel parts together results in a more efficient joining of the parts, substantially an integral structure being produced; the slower riveting process as commonly practiced with the injurious shocks incident thereto, is entirely avoided, a smoothly finished, stronger, more durable and perfect wheel being produced.

The method disclosed herein is claimed in my Patent No. 1,484,579 dated February 9, 1924.

What I claim is:

1. In a machine for securing together the parts of fan wheels comprising end plates and blades having projecting end portions, rotatable work holding means for holding the parts of the fan wheel clamped together in assembled relation, a pair of reciprocating electrodes adapted to simultaneously apply heat and pressure to the projecting end portions of a blade on the work holding means, indexing mechanism for advancing the work holding means to successively present the different blades to the electrodes in timed relation with the operation of the electrodes, operating means for the electrodes and the indexing mechanism, a current supply, and automatic switch mechanism controlling the closing of the circuit through the electrodes for each welding operation.

2. In a machine for securing together the parts of fan wheels comprising end plates and blades having projecting portions at opposite ends thereof, rotatable work holding means for holding the wheel parts clamped together in assembled relation with the projecting end portions of the blades extending through the apertures in the end plates beyond the outer faces thereof, and the latter in contact with the main end portions of the blades, a pair of reciprocating electrodes adapted to simultaneously apply heat and pressure to the opposite projecting end portions of a blade on the work holding means, indexing mechanism for advancing the work holding means to successively bring the ends of the blades in position to be operated upon by the electrodes in timed relation with the operation of the electrodes, operating means for the electrodes and the indexing mechanism, a current supply, and automatic switch mechanism controlling the closing of the circuit through the electrodes for each welding operation.

3. In a machine for securing together the parts of fan wheels comprising end rims provided with apertures, and blades having projecting end portions, rotatable work holding means for holding the parts of the wheel clamped together in assembled relation with the projecting end portions of the blades extending through the apertures in the end rims and the latter in contact with the main end portions of the blades, said work holding means including a shaft supported for rotation, a plate fixed on one end of said shaft and provided with a central stem part having a threaded upper end portion, and a second plate having a central opening with threaded walls to detachably and adjustably engage the threaded stem portion of the other plate.

4. In a machine for securing together the parts of fan wheels comprising end plates provided with apertures, and blades having projecting end portions, rotatable work holding means for holding the parts of the wheel clamped together in assembled relation with the projecting end portions of the blades extending through the apertures in the end plates, and the latter in contact with the main end portions of the blades, said work holding means including a shaft supported for rotation, a plate fixed on one end of the shaft, an outer clamping plate, and connecting and clamping means for said plate including a stem part on the first mentioned plate, said plates being adapted to engage the end plates of the fan wheel, in combination with a pair of electrodes adapted to engage and apply heat and pressure to the projecting end portions of a blade of a wheel supported by the work holding means independently of the latter.

5. In a machine for securing together the parts of fan wheels comprising end plates, and blades having projecting end portions, rotatable work holding means for holding the parts of the fan wheel clamped together in assembled relation with the projecting end portions of the blades extending through the apertures in the end plates, said work holding means including a shaft supported for rotation, a plate fixed on one end of said shaft and having work centering means thereon, an outer clamping plate, and means for adjustably connecting said outer plate to the other plate, said plates being adapted to engage the end plates of the wheel, in combination with a pair of electrodes adapted to engage and apply heat and pressure to the projecting end portions of a blade of a wheel supported by the work holding means independently of the latter.

6. In a machine for securing together the parts of fan wheels comprising end plates and blades having projecting end portions, horizontally rotatable work holding means for holding the wheel parts clamped together in assembled relation, a pair of vertically reciprocatory electrodes adapted to simultaneously apply heat and pressure to opposite end portions of a blade on the work holding means to melt down the projecting end portions of the blade and weld the parts together, indexing mechanism for advancing the rotatable work holding means to successively present the ends of the blades to the electrodes, operating means for the electrodes and indexing mechanism, and means for supplying a welding current to the electrodes.

7. In a machine for securing together the parts of fan wheels comprising end plates and blades having projecting end portions, rotatable work holding means for holding the parts of the fan wheel clamped together in assembled relation, a pair of reciprocating combined electrodes and pressing members adapted to simultaneously apply heat and pressure to the projecting end portions of a blade on the work holding means, indexing mechanism for advancing the work holding means to successively bring the end portions of the different blades in position to be operated upon by the electrodes in timed relation with the operation of the electrodes and pressing members, operating means for the electrodes and pressing members and the indexing mechanism, a current supply, automatic switch mechanism controlling the closing of the circuit through the electrodes and pressing members for each welding operation, and automatic stop mechanism for stopping the machine after a full cycle of operations.

8. In a machine for securing together the parts of fan wheels comprising end plates and blades having projecting end portions, rotatable work holding means for holding the parts of the fan wheels clamped together in assembled relation, a pair of reciprocating combined electrodes and pressing members adapted to simultaneously apply heat and pressure to the projecting end portions of a blade on the work holding means, indexing mechanism for advancing the work holding means to successively bring the end portions of the different blades in position to be operated upon by the electrodes in timed relation with the operation of the electrodes and pressing members, operating means for the electrodes and pressing members and the indexing mechanism, means for supplying a welding current to the electrodes and controlling means including a clutch, a hand lever for operating the clutch, trigger mechanism acting to automatically lock the hand lever in inactive position, and means for actuating the trigger to release the hand lever.

9. In a machine for securing together the parts of fan wheels comprising end plates and blades having projecting end portions, rotatable work holding means for holding the parts of the wheel in assembled relation, a pair of reciprocating electrodes adapted to simultaneously apply heat and pressure to the opposite end portions of a blade on the work holding means, indexing mechanism for advancing the work holding means step by step to successively present the blades to the electrodes, operating means for the electrodes and indexing mechanism, a current supply, automatic switch mechanism controlling the closing of the electric circuit through the electrodes for each welding operation, and controlling means including a clutch, a hand lever for operating the clutch, trigger mechanism acting to lock the hand lever in inactive position, means for actuating the trigger to release the hand lever, and spring means connected with the hand lever to return the same to a position to throw out the clutch.

10. In a machine for securing together the parts of fan wheels comprising end plates and blades having projecting end portions, rotatable work holding means for holding the parts of the wheel in assembled relation, a pair of reciprocating electrodes adapted to simultaneously apply heat and pressure to the opposite end portions of a blade on the work holding means, indexing mechanism for advancing the work holding means step by step to successively present the blades to the electrodes, operating means for the electrodes and indexing mechanism, a current supply, automatic switch mechanism controlling the closing of the electric circuit through the electrodes for each welding operation, and controlling means, including a clutch, a hand lever for operating the clutch, spring means for yieldably maintaining the hand lever in position to hold the clutch in inoperative position, trigger mechanism to lock the hand lever in inactive position, and means for actuating the trigger mechanism to release the hand lever.

11. In a machine for securing together the parts of fan wheels comprising end plates and blades having projecting end portions, rotatable work holding means for holding the parts of the wheel in assembled relation, a pair of reciprocating electrodes adapted to simultaneously apply heat and pressure to the opposite end portions of a blade, indexing mechanism for advancing the work holding means to successively present the blades to the electrodes, operating means for the electrodes and the indexing mechanism, and controlling means including a clutch, a hand lever for operating the clutch, spring means for yieldably maintaining the hand lever in position to hold the clutch in inoperative position, trigger mechanism to lock the hand lever in inactive position, and a part on the rotatable work holding means adapted to actuate the trigger to release the hand lever.

12. In a machine for securing together the parts of fan wheels comprising end plates and blades having projecting end portions, rotatable work holding means for holding the parts of the wheel in assembled relation, a pair of reciprocating electrodes adapted to apply heat and pressure to the opposite end portions of a blade on the work holding means, indexing mechanism for advancing the work holding means step by step to successively present the blades to the electrodes, operating means for the electrodes and the indexing mechanism, and controlling means including a clutch, a hand lever for operating the clutch, trigger mechanism acting to automatically lock the hand lever in inactive position, means for actuating the trigger to release the hand lever, and spring means to return the lever to a position to throw out the clutch.

13. In a machine for securing together the parts of fan wheels comprising end plates and blades having projecting end portions, rotatable work holding means for holding the parts in assembled relation, a pair of reciprocating electrodes to apply heat and pressure to the opposite projecting end portions of a blade on the work holding means, indexing mechanism for advancing the work holding means to successively present the blades to the electrodes, operating means for the electrodes and the indexing mechanism, and controlling means including a movable clutch part provided with a cam face, a slidably mounted hand lever provided with a part to cooperate with the cam face of said clutch part and adapted to move and hold the clutch part out of operation, trigger mechanism acting to lock the hand lever in inactive position, and means for actuating the trigger to release the hand lever.

14. In a machine for securing together the parts of fan wheels comprising end plates and blades having projecting end portions, rotatable work holding means for holding the parts in assembled relation, a pair of reciprocating electrodes to apply heat and pressure to the opposite projecting end portions of a blade on the work holding means, indexing mechanism for advancing the work holding means to successively present the blades to the electrodes, operating means for the electrodes and the indexing mechanism, and controlling means including a movable clutch part provided with a cam face, a slidably mounted hand lever provided with a roll at its lower end to cooperate with the cam face of said clutch member, and adapted to move and hold the clutch part out of operative position, trigger mechanism to lock the hand lever in inactive position, and means for actuating the trigger to release the hand lever.

15. In a machine for securing together the parts of fan wheels, a frame part provided with a tubular guide, a horizontally rotatable work holding table mounted on said frame part, a pair of reciprocating electrodes to apply heat and pressure to the opposite end portions of a blade on the work holding means, indexing mechanism for advancing the work holding means to successively present the blades to the electrodes, operating means for the electrodes and the indexing mechanism, and controlling means including a movable clutch part, a hand lever slidably mounted in the tubular guide of the frame, the hand lever being provided with a notch and having means at its lower end to engage said clutch part, the lever being adapted to be positioned to move and hold the clutch part out of operative position, a horizontally movable trigger adapted to engage in the notch of the hand lever and lock the same when the lever is moved to inactive position, and a part on the rotatable work table adapted to actuate the trigger to release the hand lever.

16. In a machine for securing together the parts of fan wheels, a frame part provided with a tubular guide, a horizontally rotatable work holding table mounted on said frame part, a pair of reciprocating electrodes to apply heat and pressure to the opposite end portions of a blade on the work holding means, indexing mechanism for advancing the work holding means to successively present the blades to the electrodes, operating means for the electrodes and the indexing mechanism, and controlling means including a movable clutch part, a hand lever slidably mounted in the tubular guide of the frame, the hand lever being provided with a notch and having means at its lower end to engage said clutch part, the lever being adapted to be positioned to move and hold the clutch part out of operative position, a spring pressed horizontally swinging trigger adapted to engage in the notch of the hand lever and lock the same when the lever is moved to inactive position, and a part on the rotatable work table adapted to actuate the trigger to release the hand lever.

17. In a machine for securing together the parts of fan wheels comprising end plates and blades having projecting end portions, means for holding the parts clamped together in assembled relation, and a pair of combined electrodes and pressing members movable relatively to each other and adapted to simultaneously apply heat and pressure to the opposing projecting end portions of the blades to melt down the projecting end portions, and weld the parts together, means for supplying a welding current to the electrodes, and operating mechanism for the electrodes providing for their application to the work with a yielding pressure.

18. In a machine for securing together the parts of fan wheels comprising end plates and blades having projecting end portions, means for holding the parts clamped together in assembled relation, and a pair of combined electrodes and pressing members movable relatively to each other and adapted to simultaneously apply heat and pressure to the opposing projecting end portions of the blades to melt down the projecting end portions, and weld the parts together, means for supplying a welding current to the electrodes, and operating mechanism for the electrodes providing for their application to the work with a spring pressure.

19. In a machine for securing together the parts of fan wheels comprising end plates and blades having projecting end portions, rotatable work holding means for holding the parts of the wheel clamped together in assembled relation, a pair of reciprocating electrodes to simultaneously apply heat and pressure to the projecting end portions of the blades on the work holding means, indexing mechanism for advancing the work holding means to successively present the blades to the electrodes, operating means for the electrodes and indexing mechanism, and automatic switch mechanism including a magnetically operated switch, and a cam operated timing switch.

20. In a machine for securing together the parts of fan wheels comprising end plates, and blades having projecting end portions, rotatable work holding means for holding the parts of the fan wheel clamped together in assembled relation, a pair of reciprocating electrodes adapted to simultaneously apply heat and pressure to the projecting end portions of a blade on the work holding means, indexing mechanism for advancing the work holding means to successively present the different blades to the electrodes in timed relation with the operation of the electrodes, a source of electric current, automatic switch mechanism controlling the closing and opening of the circuit through the electrodes for each welding operation, said switch mechanism including a stationary contact, a cooperating pivotally mounted switch arm, a rotary driven shaft, and a cam on the shaft adapted to move the pivotally mounted switch arm to close the circuit.

21. In a machine for securing together the parts of fan wheels comprising end plates, and blades having projecting end portions, rotatable work holding means for holding the parts of the fan wheel clamped together in assembled relation, a pair of reciprocating electrodes adapted to simultaneously apply heat and pressure to the projecting end portions of a blade on the work holding means, indexing mechanism for advancing the work holding means to successively present the different blades to the electrodes in timed relation with the operation of the electrodes, a source of electric current, automatic switch mechanism controlling the closing and opening of the circuit through the electrodes for each welding operation, said switch mechanism including a stationary contact, an arm pivotally mounted near one end thereof for oscillation in a vertical plane, a finger projecting from said arm and yieldably mounted thereon, said finger carrying a contact adapted to engage said stationary contact, a rotary driven shaft, and a cam on the shaft adapted to operate the arm to close the circuit.

In testimony whereof I hereunto affix my signature.

FREDERICK R. STILL.